United States Patent [19]

Hunt et al.

[11] Patent Number: 5,469,362

[45] Date of Patent: Nov. 21, 1995

[54] DISPATCHING METHOD AND APPARATUS FOR MONITORING SCHEDULED MAIL

[75] Inventors: William M. Hunt, Shelton; Ronald P. Sansone, Weston, both of Conn.

[73] Assignee: Pitney Bowes Inc., Stamford, Conn.

[21] Appl. No.: 243,358

[22] Filed: May 16, 1994

[51] Int. Cl.⁶ .................................................. G06F 19/00
[52] U.S. Cl. ............................................ 364/478; 364/550
[58] Field of Search ........................ 364/464.02, 464.03, 364/478, 550, 551.01

[56] References Cited

U.S. PATENT DOCUMENTS

| | | | |
|---|---|---|---|
| 3,321,613 | 5/1967 | Searle | 364/551.01 |
| 4,346,446 | 8/1982 | Erbstein et al. | 364/551.01 |
| 4,807,108 | 2/1989 | Ben-Arieh et al. | 364/148 |
| 5,142,482 | 8/1992 | Sansone | 364/478 |
| 5,216,620 | 6/1993 | Sansone | 364/478 |

Primary Examiner—Edward R. Cosimano
Attorney, Agent, or Firm—Ronald Reichman; Melvin J. Scolnick

[57] ABSTRACT

Method and apparatus for monitoring the dispatching of mail and to coordinate the production of mail with common carrier dispatch schedules. The mail is produced in a sequence that is intended to meet the dispatch schedule of common carriers. The movement of mail is monitored and the scheduling of mail production is altered if consistent mail delivery irregularities are determined.

6 Claims, 2 Drawing Sheets

5,469,362

DISPATCHING METHOD AND APPARATUS FOR MONITORING SCHEDULED MAIL

RELATED CASES

Attention is directed to the following copending patent applications: U.S. Pat. No. 5,329,102 issued Jul. 12, 1994 entitled Method and Apparatus for Preparing Validated Mail Tray Labels abandoned, which became Ser. No. 07/963,013 filed Oct. 19, 1992, abandoned, which became Ser. No. 08/181,476 filed Dec. 29, 1993, U.S. patent application Ser. No. 641,985 filed Jan. 16, 1991 and entitled Automated Labeling System; and U.S. patent application Ser. No. 07/900,397 filed Jun. 18,1992 and entitled Just-In-Time Delivery System.

BACKGROUND OF THE INVENTION

Throughout the history of the mail delivery, there has been a gradual evolution whereby the postal service encourages mailers to prepare their mail in such a way as to reduce the effort required on the part of the postal service for processing such mail. As an inducement to the mailer to prepare the mail in such a way so as to bring about faster mail delivery, the postal service offers a postage discount to mailers for such items as presorted mail and printing of nine digit zip codes. Discounts are also given when the mail is produced in a manner that allows automatic processing with machines such as optical character recognition (OCR) sorters and bar code readers and sorters.

Even with present mail processing techniques that have come into being as a result of reduced postage rates for presorted mail, zip code mail and the like, the postal service is still experiencing difficulties in meeting targeted delivery times for the mail. The primary reason for such difficulties is the increase in volume of mail that has taken place over the decades.

Systems and methods have been conceived and described wherein the efforts required by the postal service to process mail has been reduced. One of the problems the postal service faced previously was that a significant amount of mail presented to the postal service did not have the required postage or did not meet the requirements of postal regulations. A scheme for overcoming this problem was disclosed in U.S. Pat. No. 5,329,102 issued Jul. 12, 1994. In that patent application, a scheme is disclosed whereby mail is processed in such a manner that the mail is sorted to separate the local mail from the non local mail, the non local mail is placed into trays in accordance with their zip codes and a label is printed that identifies the mail in the tray for subsequent processing. As a part of this scheme, the postal service is given a running account of the mail being processed so that postage can be accurately determined and the post office is able to process the mail further without having to inspect the same to assure proper payment.

U.S. patent application Ser. No. 641,985, supra, discloses a system whereby labels can be printed by a mailer for the trays and the sacks into which mail is placed for a common carrier, particularly an air carrier. U.S. Pat. No. 5,216,620 discloses a system and method whereby mail that is not addressed locally is conveyed by a mailer to a common carrier. In so doing, the mailer communicates to the local post office information relative to the mail with regard to the number of trays of mail, their weight, their destination and information that may allow the mailer to receive a postal discount for the mail. Upon receipt of the information, the post office would then determine the cost of air freight for the mail which is looked upon by the common carrieras bulk freight.

Although the concepts described in these patent applications and patent addressed areas where activities on the part of the mailer would benefit the postal service, there are still many areas where the efficiency of mail production can be increased.

In the prior production of mail, non local mail produced by a mailer so as to obtain postal discounts was still sent to the local post office. This procedure was addressed by U.S. Pat. No. 5,216,620 issued Jun. 1, 1993. Although such a system functioned well, there was no correlation between the destination of the mail being processed and the time of flight for such destination. This was addressed by the concept disclosed in U.S. patent application Ser. No. 07/900, 397 supra. In that patent application, a just-in-time scheme is disclosed whereby a mailer produces mail in such a way that mail which is not addressed locally is conveyed to a common carrier in sufficient time to be placed on the next transportation vehicle without spending unnecessary time waiting to be loaded onto such transportation vehicle. This just-in-time scheme was accomplished by comparing the sequence in which mail runs were to be produced with the transportation schedule of the common carrier and correlating the production times of the mail runs with such transportation schedule. Although use of the just-in-time scheme resulted in enhanced mail production scheduling, there was a need still for monitoring of the scheduled mail production and the time of arrival of the mail at the common carrier to assure that the mail production schedule correlated to the common carrier's dispatch schedule to assure that the just-in-time scheduling was accurate.

SUMMARY OF THE INVENTION

A monitoring system has been devised wherein the actual production times of mail are monitored and compared with the scheduled production times to determine if there is a disparity between the two. The monitoring system collects the data as mail production activity and dispatching are occurring and displays the planned dispatch schedule. Regular updating of the status of each distinction is possible by comparing the current time to the scheduled dispatch time. If no trays to the destination remain, a completed status is displayed. Any remaining trays of a scheduled dispatch whose time has not elapsed are indicated as being in progress and on schedule. Trays whose scheduled dispatch time has elapsed are identified as being late, if the last possible dispatch time has passed or may have a warning status issued if the current time is within a defined slack period between the scheduled dispatch time and the last possible dispatch time. These indications can quickly inform one as to the progress of production runs. Overall run statistics can be presented, as well as performance measures, such as expected mail delivery times based on actual dispatches and assigned transportation routes. The last function of the monitoring system is to prepare data for the entire production run for detailed analysis by the mailers computer system so that future mail runs can be improved in terms of correlating the production runs with the scheduled dispatching.

DETAILED DESCRIPTION OF THE PREFERRED EMBODIMENT

Figure 1:
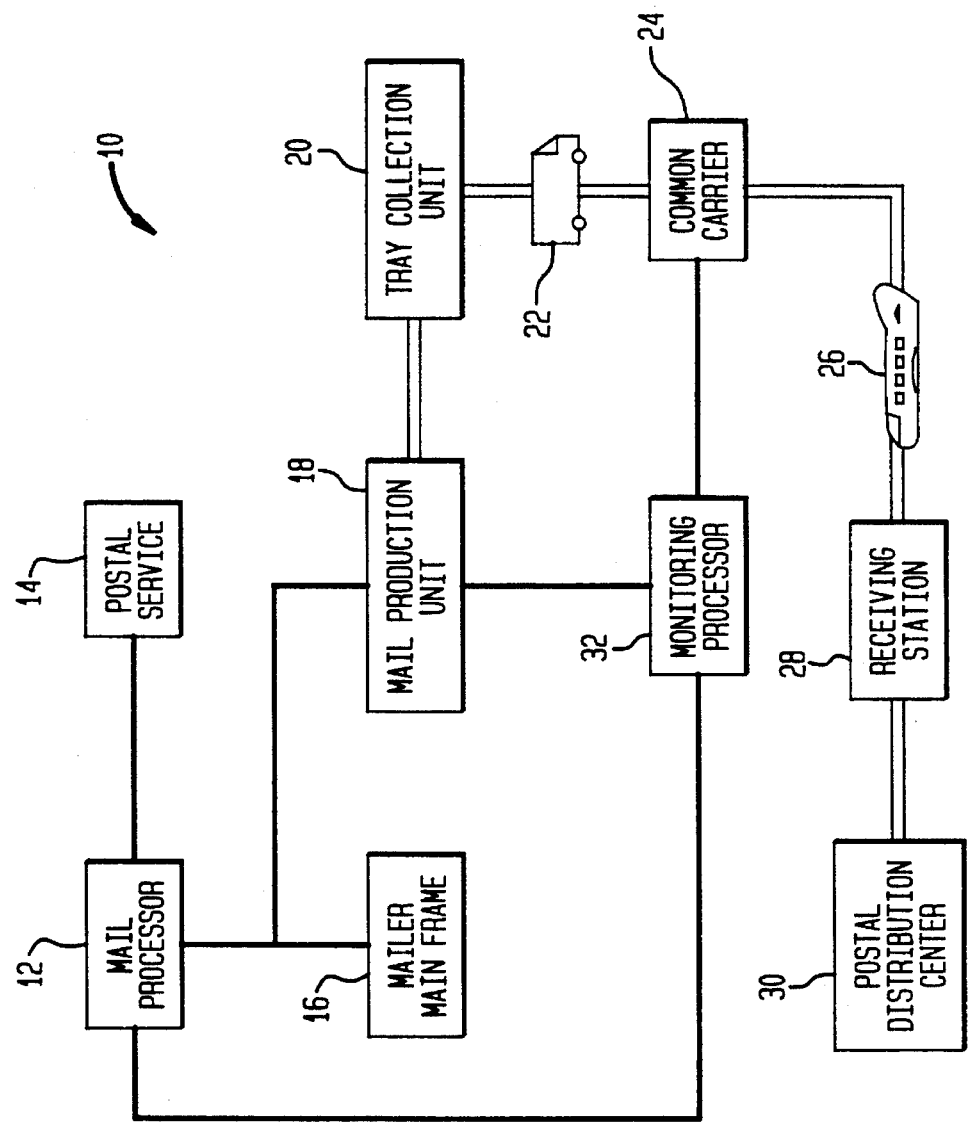
FIG. 1 shows a mail production, dispatching system in which the instant invention can be practiced.

With reference now to FIG. 1, a mail production and dispatching system is shown generally at 10. In FIG. 1 connections for the transmission of data are indicated by a single line and the physical conveyances of mail are indicated by double lines. The mailer has a processor 12 that serves the function of coordinating mail run production cycles with dispatching schedules as will be described hereinafter. The processor 12 can be any of a number of commercially available Compatible PC's with a 386 capability or higher. The mail processor 12 is in communication with the postal service 14 and is in connection with a main frame 16 which stores a program such as a Finalist® mail schedule that contains names and address lists of the recipients of mail. Each mail run that is designated the by Finalist® mail schedule will be grouped in accordance with the zip codes of the mail pieces. Ordinarily, such a mail list would arrange the mail run in sequential numerical zip code order, but in accordance with the scheme disclosed in U.S. patent application Ser. No. 07/900,397, supra, the mail run will be organized in terms of their zip codes so that they are able to arrive at a dispatch station just-in-time to be loaded onto a common carriers vehicle. By mail run is meant a continuous mail production with a large number of mail pieces grouped according to zip codes. The sequencing of such mail runs is controlled by the processor 12 which reprograms the main frame 16 as required and in accordance with the invention disclosed in Ser. No. 07/900,397 and the instant invention.

The main frame 16 is connected to a mail production facility 18 that is capable of performing those tasks to produce mail runs. These tasks include addressing the mail, inserting one or more inserts into an envelope, weighing each mail piece, determining the postage for each mail piece, placing the mail pieces into trays, printing a tray label for the trays and conveying the trayed labels to a tray collection unit 20 where they are placed into cages. All these functions are well known in the art and will not be described hereinafter. See for example U.S. Pat. Nos. 5,142,482 and 5,216,620.

Upon completion of the mail runs, they will be placed upon a truck 22, or other convenient vehicle, and transported to the common carrier 24. It will be appreciated that more than one mail run can be placed on a truck and the mail runs can have different zip codes depending upon the dispatching schedule. For example one mail run could have the three digit zip 302 for Georgia and another mail run 554 for Minnesota, but would still comply with the common carrier dispatch schedule. The common carrier 24 can use any of a number of different types transportation vehicles, such as trucks, ships, trains and the like, but this invention is described with the use of an airplane 26. The airplane 26 delivers the mail from the common carrier 24 to receiving station 28 of a postal distribution center 30 where there will be a finer sorting of the mail for distribution within the three digit zip and common carrier 24. A monitoring process 32 is in communication with the mail processor 12. Professor 32 also monitors the actual arrival time at common carrier 24 and determines of the time of a mail run arriving at common carrier 24 is prior to the scheduled dispatch time.

In operation, the mail processor 12 will have loaded therein the dispatch schedule of the common carrier 24. By dispatch schedule is meant the arrival and departure times of transportation vehicles 26 to and from the common carrier 24. This dispatch schedule may be provided either by the postal service 14 or received by the mail processor 12 directly from the common carrier 24. The mail processor 12 will communicate with the mailer main frame 16 for the purpose of scheduling the mail runs to correlate with the dispatch schedule of the common carrier 24. Reference can be had to U.S. patent application Ser. No. 07/900,397, supra, for a description as to just-in-time scheduling of mail runs.

The main frame will then control the production of mail runs at a mail production facility 18. By a mail run is meant a set of mail pieces that is to be delivered as a unit to the common carrier 24. This mail production facility 18 includes a printer, inserter, scale, labeler and other units necessary for the production of mail. Reference can be had to U.S. Pat. No, 5,142,482 for details thereof. The mail is collected in trays at the tray collection unit 20 and sent by truck to the common carrier 24. It will be appreciated that if the mailer is in the vicinity of a postal distribution center, the truck can take the mail directly to such postal distribution center; however, in most instances it would be necessary to deliver the mail to a postal distribution center by means of an aircraft 26 and the like.

Figure 2:
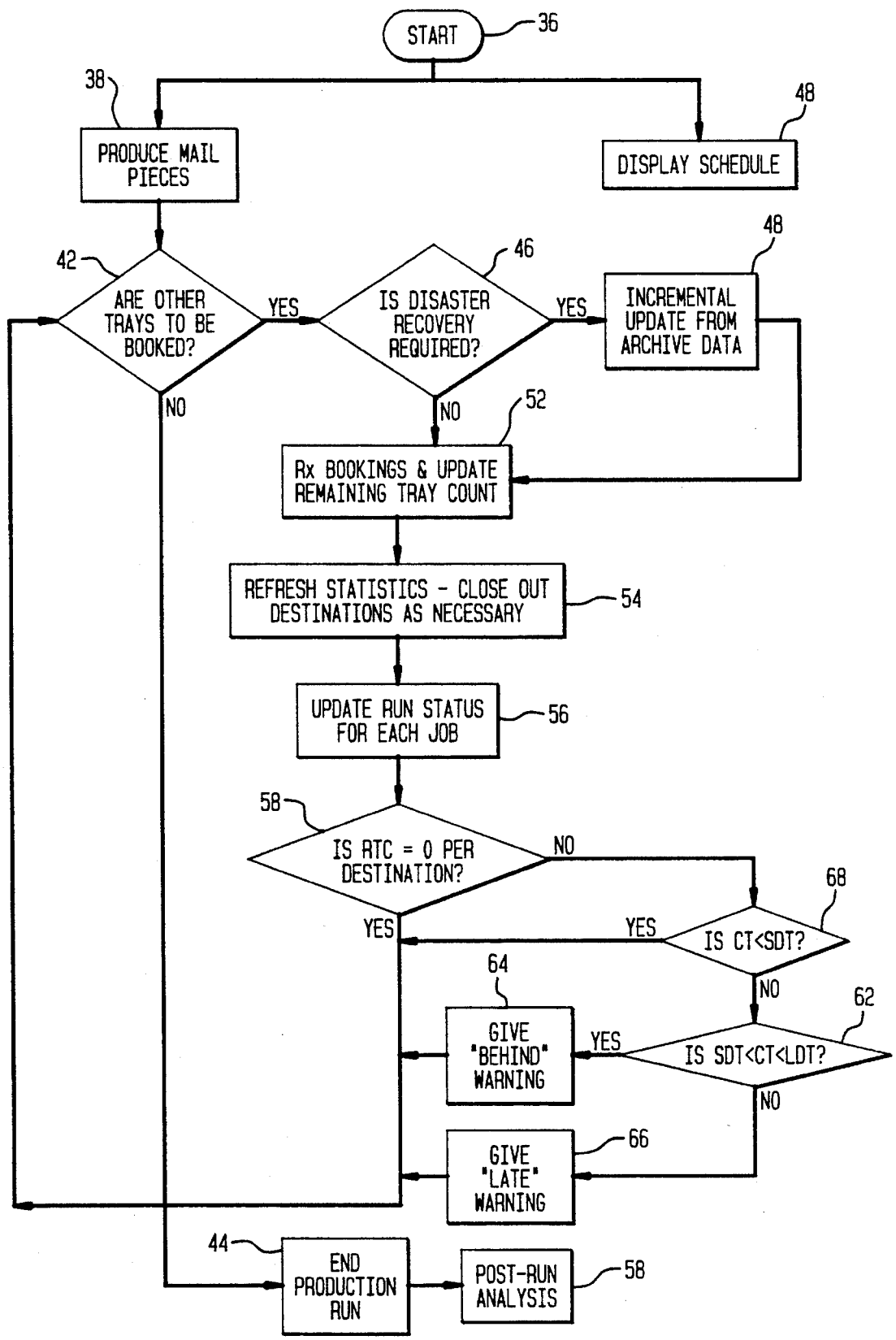
FIG. 2 is a flow chart that represents the program for the monitoring function of the invention.

With reference to FIG. 2, the method by which the mail runs are monitored, by the monitoring processor 32, will be described. The system 10 is enabled 36 and mail pieces are produced 38 by the mail production unit 18. As the operation begins, the dispatching schedule is displayed 40 on the monitor of the monitoring processor 32. As a mail run progresses, the question is asked, are there other trays to be booked 42, i.e., are portions of mail runs to be produced. If the answer is no, then the production run ends 44 and a post run analysis is made 50. But, if there are other trays to be booked, the question is asked whether a disaster recovery is required 46. A disaster recovery is necessary only in the event of a system shutdown. If disaster recovery is required, then there is an incremental update 48 and then the bookings are updated for the remaining tray counts 52. More specifically, the schedule is re-arranged so that those bookings that cannot meet the dispatch schedule are taken out of sequence in favor of bookings that can meet the dispatch schedule.

If no disaster recovery is required 46, the bookings are directly received and the remaining tray count updated 52. Thereafter, the statistics are refreshed and the destination is closed out 54. Upon completion of this step, the run statistics are updated 56 for each job and the question is asked, does the remaining tray count equal 0. If yes, there is a return to the production inquiry as to trays to be booked 42, but if no, the question is asked is the current time less then the schedule dispatch time 60. If the answer is yes, then there is a return to the booking trays engineering 42, but if the answer is no, the question is asked whether the scheduled dispatch time is less than the current time and if the current time is less than the last dispatch time before the mail run is late 62. If yes, a behind schedule warning is given 64, but if no a late warning is given 66. Thereafter, there is a return to the booked trays inquiry 42.

In the post run analysis 50, the monitoring processor 32 will review the results of the mail production runs to determine how effectively the mail production was scheduled. If it becomes evident that certain mail production runs are being completed too late to conveniently meet the common carrier dispatch schedules, the monitoring process will communicate with the mailer processor 12 to bring about a revision in the mail production schedule.

Thus, what has been shown and described is a method and apparatus that achieves effective mail production to assure that mail is being produced and sent to a common carrier in an expedient time so as to assure prompt delivery to the postal service. More specifically, the method and apparatus in the instant invention allow the monitoring of the scheduling of production mail runs so that any inaccuracies can be corrected.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A mail monitoring system for scheduled dispatchment of mail to the postal service via common carrier, the combination comprising:

a mail production facility for printing addresses on a mailpiece, assembling one or more inserts into a mailpiece, determining the postage of each mailpiece and assembling similar destination mailpieces in the same tray;

a first processor having mail lists therein in communication with said mail production facility; said first processor controls the printing of addresses on the mailpiece;

a second processor having a common carrier dispatching schedule therein in communication with said first processor and said mail production facility;

a tray collection unit for receiving mailpieces assembled in trays from said mail production facility;

a common carrier for receiving trayed mail from said tray collection unit; and a third processor in communication with said common carrier and said second processor for monitoring the receipt of trayed mail by said common carrier and comparing the receipt of the trayed mail by the common carrier with the dispatching schedule of said second processor to maintain the synchronization of the schedule of said carrier with the mail printed by said mail production facility.

2. The mail production system of claim 1 wherein said third processor also is in communication with said mail production facility for monitoring the actual schedule of said common carrier.

3. The mail production system of claim 2 further including said second processor being in communication with the postal service.

4. A method of monitoring and scheduling dispatch merit of mail via common carriers, the steps comprising:

a) printing a plurality of mail piece runs in sequence in accordance with the zip codes of the mail runs and a dispatch schedule, b) determining if there has been a delay in the actual schedule of a common carrier and the dispatch schedule cannot be met, c) rearranging the sequence of mail piece runs if there has been a delay, d) sending the mail piece runs to a common carrier, e) determining if the time of a mail run arriving at the common carrier is prior to the scheduled dispatch time, and f) rearranging the dispatch schedule if the time of arrival of said mail run does not arrive prior to the scheduled dispatch time.

5. The method 4, further comprising the step of conducting a post analysis after the production run ends to determine if the production schedule is timed so as to meet the dispatch schedule.

6. The method of claim 4 further comprising monitoring the production of mail runs to determine if a delay has been experienced in the mail production and rearranging the production schedule so as to conform to the dispatch schedule when a delay has been determined.

* * * * *